Sept. 24, 1929.  J. BAMFORD ET AL  1,729,470

MOWING MACHINE

Filed Sept. 10, 1925

Patented Sept. 24, 1929

1,729,470

UNITED STATES PATENT OFFICE

JOSEPH BAMFORD AND CYRIL JOSEPH BAMFORD, OF UTTOXETER, ENGLAND

MOWING MACHINE

Application filed September 10, 1925, Serial No. 55,567, and in Great Britain October 7, 1924.

This invention relates to mowing machines of the kind wherein the cutting of the crop is effected by a reciprocating knife or cutter bar operating in conjunction with a toothed bar, the reciprocating motion of the cutter bar being received from a crank pin or its equivalent associated with a shaft driven by gearing from the motion of one of the supporting wheels of the machine.

The object of the present invention is to provide an improved form of gearing for this type of machine whereby easy and noiseless running is obtained and whereby the power necessary for drawing the machine is reduced.

According to the present invention we provide a driving shaft driven from one of the supporting wheels of the machine and arranged adjacent to and substantially parallel with the axle of the machine, the said driving shaft being supported in suitable bearings and provided with a clutch or its equivalent so that it can be placed out of action when required, bevel gearing being employed to convey the motion between this driving shaft and the shaft which drives the crank or its equivalent for the cutter bar, the said bevel gearing having curved skew teeth so that a plurality of teeth in the driving and driven bevel wheels are in engagement at the same time. With this arrangement noise is reduced to a minimum as each pair of teeth come into engagement before the preceding pair have separated and the engagement of each individual pair of teeth is gradual. Further, the end thrust upon each bevel wheel is reduced to a minimum so that the power absorbed in pulling the machine is reduced.

Referring to the drawings:—

Figure 1:
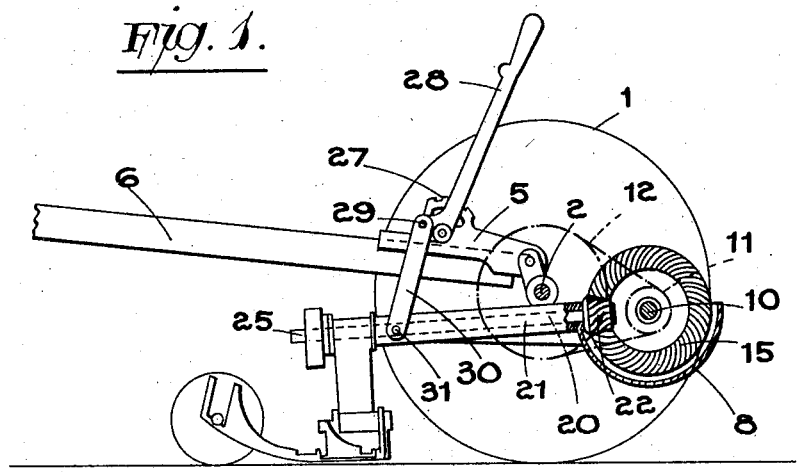
Figure 1 is an elevation with the near supporting wheel removed.
Figure 2:
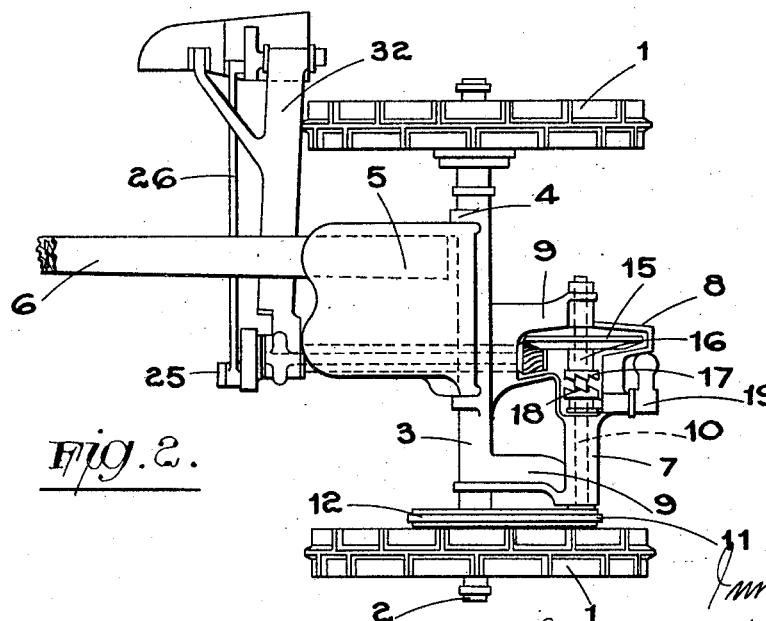
Figure 2 is a plan view.

In the machine illustrated, two supporting wheels 1 are mounted on an axle 2 provided with a cast metal axle casing 3 which is formed with a pair of lugs or brackets 4 on its upper side. A frame member 5, which may be of cast metal, is pivoted between the brackets 4 and is adapted in any suitable manner, for instance, by means of bolt holes and a recessed face, for receiving the end of the pole 6. Bearings 7 and the lower half of a gear housing 8 are cast in one with the axle casing 3 and held in spaced relation therefrom by two arms or webs 9. These bearings carry a driven shaft 10 which is parallel to the axle 2 and carries at one end a small chain sprocket 11 complementary to a larger chain sprocket 12 located on the inner side of one of the supporting wheels 1. The upper half of the gear housing (not shown in the drawings) is formed separately.

Loosely mounted upon the driven shaft and within the casing 8 is a unit which is comprised by a bevel gear 15, a sleeve 16 and a member 17 having lateral ratchet teeth. Complementary to the member 17 is a member 18 which is provided with similar ratchet teeth and is keyed to the shaft 10 in a manner allowing it to be moved longitudinally thereon. The member 18 is adapted to be slidden longitudinally on the shaft 10 so as to be brought into or out of engagement with the member 17 by means of a pivotally mounted controlling shaft 19 having a crank pin which engages a peripheral groove in the member 18. Thus, it will be seen that the bevel gear 15 can be connected to rotate with the shaft 10 at will by means of members 17 and 18 which constitute a one way clutch device.

A driven shaft 20 is mounted longitudinally of the machine in a casing 21 which may be formed in one with the axle casing 3, or partly separated therefrom if found convenient, has a bevel pinion 22 located at one end of it and within the gear housing 8 and in engagement with the bevel gear 15. The bevel gear 15 and pinion 22 are formed with curved skew teeth which ensure that a plurality of teeth in the driving and driven wheels will be in engagement at the same time. The other end of the driven shaft 20 which is provided with a crank pin 25 is connected to the cutter bar of the machine by means of a connecting rod 26.

The frame member 5 is provided with a toothed rack 27 and with a pivotally mounted hand lever 28 provided with any suitable means (not shown in the drawings) by which it can be engaged with the rack 27 and held in the desired position. The operative end of the lever 28 is connected at 29 to a link 30 which is pivoted at 31 to the casing 21 of the driven shaft 20. The cutting apparatus of the mower is mounted upon the casing 21 by means of a transverse supporting member 32, and a diagonal bracing member (not shown in the drawings) or other means for holding the member 32 rigidly with the casing 21 is provided. Thus, it will be seen that movement of the hand lever 28 enables the cutting apparatus of the machine to be raised or lowered relatively to the ground.

From the foregoing, it will be apparent that by means of this invention, we have provided an improved and simplified construction of mowing machine. The drive or transmission of power from the supporting wheels to operate the reciprocating cutter bar is conveyed to the longitudinally arranged driven shaft by means of bevel gearing which has curved skew teeth which reduces the friction and noise of the machine.

What we claim then is:—

In a mowing machine the combination of an axle, road wheels thereon, a casing surrounding said axle, lugs upon said casing carrying a frame member for receiving the end of a draught pole, a casing disposed at the rear of said axle casing and containing a shaft driven from said axle by means of gearing and disposed substantially parallel thereto, a cutter operated by means of a cutter shaft disposed at right angles to said axle, bevel wheels connecting said cutter shaft with said driven shaft and clutch mechanism under the control of the operator to enable the cutter to be brought into or out of operation at will.

In witness whereof we affix our signatures.

JOSEPH BAMFORD.
CYRIL JOSEPH BAMFORD.